United States Patent
Frank et al.

(10) Patent No.: US 10,306,108 B2
(45) Date of Patent: May 28, 2019

(54) GENERATING HALFTONES

(71) Applicant: HP INDIGO B.V., Amstelveen (NL)

(72) Inventors: Tal Frank, Ness Ziona (IL); Dror Kella, Ness Ziona (IL); Boaz Tagansky, Rishon Letzion (IL); Oren Haik, Ness Ziona (IL); Yotam Ben-Shoshan, Beer Tuvia (IL); Marina Limonov, Ness Ziona (IL); Ram Dagan, Modiin (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/039,694

(22) Filed: Jul. 19, 2018

(65) Prior Publication Data
US 2018/0324322 A1    Nov. 8, 2018

Related U.S. Application Data

(63) Continuation of application No. 15/422,268, filed on Feb. 1, 2017, now Pat. No. 10,051,153.

(51) Int. Cl.
*H04N 1/52* (2006.01)
*H04N 1/60* (2006.01)
*H04N 1/405* (2006.01)

(52) U.S. Cl.
CPC ............ *H04N 1/4057* (2013.01); *H04N 1/52* (2013.01); *H04N 1/6008* (2013.01); *H04N 1/6058* (2013.01)

(58) Field of Classification Search
None
See application file for complete search history.

(56) References Cited

U.S. PATENT DOCUMENTS

| | | | | |
|---|---|---|---|---|
| 5,309,526 A | * | 5/1994 | Pappas | H04N 1/4052 358/3.05 |
| 6,128,099 A | * | 10/2000 | Delabastita | H04N 1/4058 358/1.9 |
| 6,243,100 B1 | * | 6/2001 | Curry | G06K 15/1223 345/619 |
| 6,310,638 B1 | * | 10/2001 | Heiles | B41J 19/005 347/37 |
| 8,355,189 B2 | | 1/2013 | Shacham | |
| 8,437,037 B2 | | 5/2013 | Broddin et al. | |
| 8,730,547 B2 | | 5/2014 | Chen et al. | |

(Continued)

OTHER PUBLICATIONS

"Screening for Every Printing Process"; Mar. 10, 2006; http://www.digiprint-pl.eu/oprogramowanie-esko-suit/product/imaging-engine?file=pliki/digiprint/pliki%20do%20pobrania/opakowania/Oprogramowanie%20EskoArtwork%20Suite%2010/EG_G2558198_screening(flexrip).pdf.

*Primary Examiner* — Anh-Vinh T Nguyen
(74) *Attorney, Agent, or Firm* — HP Inc. Patent Department (57) ABSTRACT

A halftone comprises a first halftone screen and a second halftone screen. The first halftone screen comprises a first plurality of amplitude modulated dots arranged according to a first plurality of rows, the first plurality of rows being orientated according to a first direction and comprising a first dot spacing. The second halftone screen comprises a second plurality of amplitude modulated dots arranged according to a second plurality of rows, the second plurality of row being orientated in a second direction and comprising a second dot spacing. The first direction and the second direction define an angle of 45 degrees or less and a ratio of the second dot spacing to the first dot spacing is less than one.

20 Claims, 6 Drawing Sheets

(56) References Cited

U.S. PATENT DOCUMENTS

| | | | |
|---|---|---|---|
| 9,754,341 B2 | 9/2017 | Falkenstern | |
| 2002/0186418 A1* | 12/2002 | Inoue | H04N 1/4051 358/3.14 |
| 2003/0058291 A1 | 3/2003 | Pinard | |
| 2004/0090654 A1* | 5/2004 | Minnebo | H04N 1/4053 358/3.03 |
| 2004/0113958 A1* | 6/2004 | Minnebo | H04N 1/40087 347/5 |
| 2004/0119994 A1* | 6/2004 | Minnebo | H04N 1/4052 358/1.9 |
| 2004/0218221 A1 | 11/2004 | Hirano | |
| 2005/0157347 A1 | 7/2005 | Dewitte | |
| 2005/0185009 A1* | 8/2005 | Claramunt | B41J 2/435 347/16 |
| 2008/0130054 A1 | 6/2008 | Wang | |
| 2008/0130056 A1* | 6/2008 | Wang | H04N 1/4058 358/3.06 |
| 2008/0180475 A1 | 7/2008 | Eldar | |
| 2008/0247000 A1* | 10/2008 | Lammens | H04N 1/4052 358/3.03 |
| 2009/0296122 A1 | 12/2009 | Broddin | |
| 2010/0079812 A1 | 4/2010 | Bernal | |
| 2010/0079813 A1 | 4/2010 | Bernal | |
| 2011/0259219 A1 | 10/2011 | Behrens | |
| 2011/0279831 A1* | 11/2011 | Shacham | B41F 15/10 358/1.9 |
| 2012/0133990 A1* | 5/2012 | Wang | H04N 1/52 358/3.2 |
| 2012/0188611 A1* | 7/2012 | Shacham | H04N 1/4058 358/3.06 |
| 2013/0163053 A1* | 6/2013 | Wang | H04N 1/4051 358/3.06 |
| 2014/0009770 A1 | 1/2014 | Chen | |
| 2015/0341526 A1 | 11/2015 | Ashworth et al. | |
| 2016/0275326 A1 | 9/2016 | Falkenstern | |
| 2018/0130169 A1 | 5/2018 | Falkenstern | |
| 2018/0220039 A1* | 8/2018 | Frank | H04N 1/4057 |

* cited by examiner

GENERATING HALFTONES

BACKGROUND

A printing system may be associated with a color space (hereinafter termed a "colorant color space"), defined by one or more colorants available to the printing system for deposition or application to a print medium. An example of a colorant color space is the Cyan (C), Magenta (M), Yellow (Y), Black (K) color space (also termed the "CMYK" color space), wherein four variables are used in a subtractive color model to represent respective quantities of colorants. Examples of colorants include printing fluids (e.g. inks, dyes, pigments and/or paints) and printing powders (e.g. toners).

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

A printing system may utilize a halftone process to reproduce a continuous tone image in the colorant color space using a series of dots. This enables the imaging system to approximate a continuous tone image by using a discrete number of colorant levels (e.g. a discrete number of printing fluid drops per unit area). The result of this process is an output in the form of a color separated halftone which comprises a halftone separation for each colorant available to the printing system. In this respect, the output of any particular printing system is dependent on the characteristics of the particular halftone process that is used by the printing system.

Amplitude modified halftones refer to halftone patterns where a plurality of dots of varying sizes are used to reproduce a range of tones in a given halftone separation. The dots may be round, elliptical, square or any other suitable shape. The plurality of dots in a given halftone separation are arranged according to a grid or lattice, with relatively dark tones being reproduced using relatively large dots and relatively lighter tones being reproduced using relatively small dots. Amplitude modified halftones have found widespread use in analog printing systems, according to which the halftone screens are transferred to a print medium using manually prepared plates for each colorant. The resolution of a given halftone separation in an amplitude modulated halftone may be expressed in terms of lines per inch (LPI) of the halftone. Thus, the LPI of a given halftone separation also serves as a measure of the spacing between dots in the halftone separation.

In principle, an image may be formed by overlaying each halftone separation in an amplitude modulated halftone in the same orientation (i.e. at the same angle). However, in practice, when two or more screens are overlaid, the variation in relative positioning between the dots of different colorants can result in an interference pattern known as a moiré pattern, which may manifest itself as a plurality of rosette structures. One source of this variation in relative dot positions is color plane mis-registration (CPR) between the color planes when the halftone is printed. Occurrence of a moiré pattern in a printed image has a negative impact on image quality.

According to a first approach, the negative impact of moiré interference on image quality may be reduced by increasing the LPI of the halftone such that the rosette structures associated with the moiré interference are reduced in size and thus reduced in terms of granularity and grain. However, because the LPI of a given halftone is limited by the maximum resolution of a printing process, elimination of rosette structures may not be possible in all situations. Thus, such techniques may not be suitable for digital printing systems, which often utilize relatively low LPI halftone screen resolutions, compared to analog printing systems.

According to a second approach, the negative impact of moiré interference on image quality may be reduced by overlaying a plurality of halftone separations at different angles relative to each other. For example, in a printing system based on the CMYK colorant color space, the halftone separations for the three most visible colorants may be overlaid and printed with a 30 degree angular separation between each halftone separation (e.g. C at 105 degrees, M at 75 degrees, and K at 45 degrees). In such arrangements, the Y separation is the least visible color and is therefore angled 0 degrees (i.e. 15 degrees from the C separation). However, such techniques may not be suitable for digital printing systems, which often utilize relatively low LPI halftone screen resolutions, compared to analog printing systems.

Certain examples described herein relate to amplitude modulated halftones which provide reduced or minimal moiré interference. In particular, certain examples relate to amplitude modulated halftones which provide reduced or minimal moiré interference using relatively low resolution halftone separations, and are thus particularly suitable for use in digital printing processes. In some examples, these amplitude modulated halftones provide improved image quality in terms of sharpness and softness for relatively low resolution halftone separations, and are thus particularly suitable for mass production.

Further, certain examples described herein relate to amplitude modulated halftone, wherein the relative resolutions and angular separations of a first halftone separation and a second halftone separation are selected to satisfy a "harmonic" condition, which results in reduced or zero moiré interference between the first and second halftone separations. Further details of the harmonic condition are provided below with reference to FIGS. 1 to 6.

Figure 1:
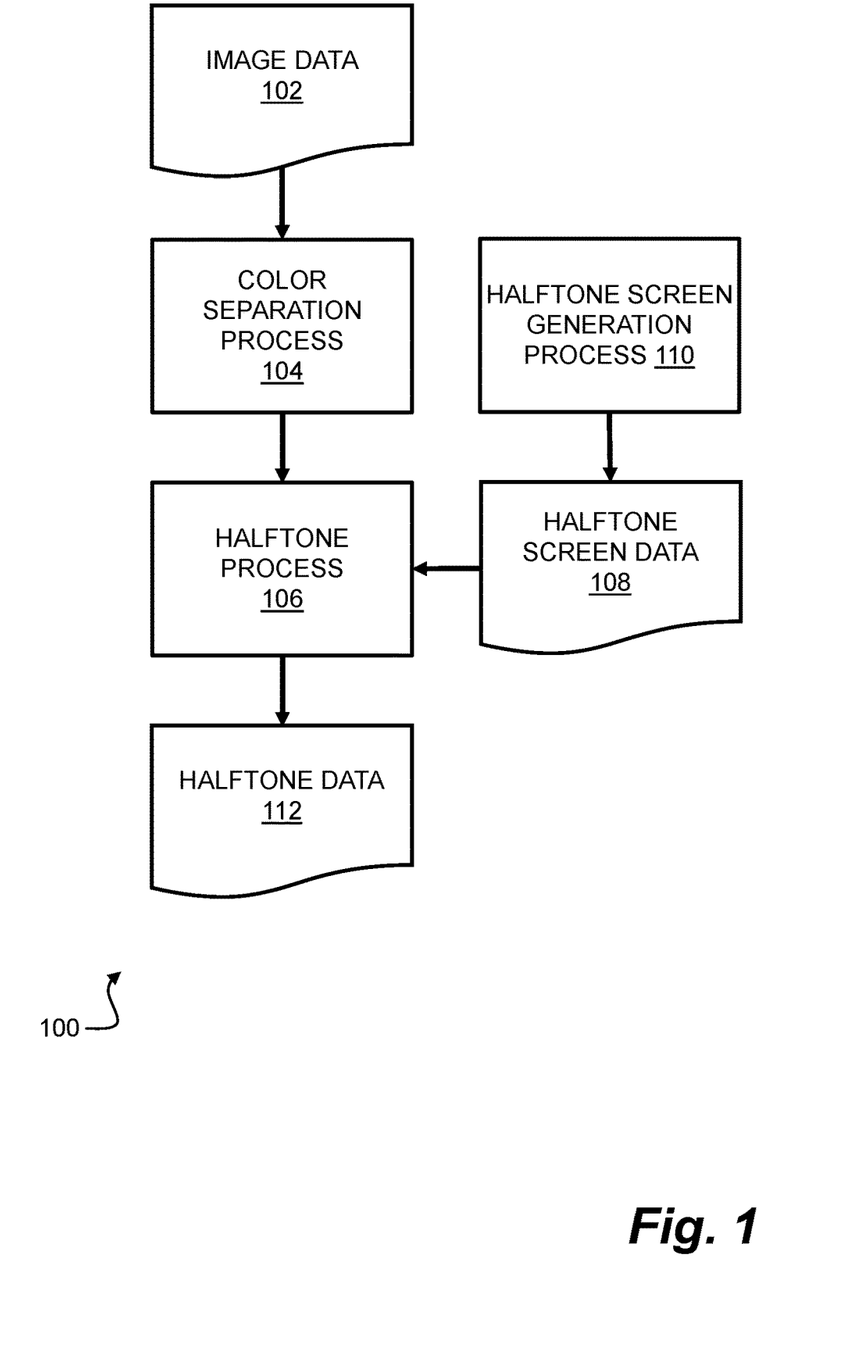
FIG. 1 is a schematic diagram showing an imaging pipeline in accordance with an example.

FIG. 1 shows an imaging pipeline 100 for use in a printing system (not shown) in accordance with an example. In particular, the imaging pipeline 100 utilizes a set of halftone screens which are generated to satisfy a harmonic condition between at least a first halftone screen and a second halftone screen, thereby ensure reduced or minimal moiré interference and improved print quality.

The imaging pipeline 100 receives image data 102 that is passed into a color separation process 104. The image data 102 comprises color data which represents an input image in terms of image-level pixel representations in an image color space (e.g. the RGB color space). The color separation process 104 maps the image data 102 from the image color space to a colorant color space, such as the CMYK color space. To perform this color separation, the color separation process 104 may utilize profiles characterizing the image color space and the colorant color space with respect a profile connection space. For example, the color separation process 104 may utilize the CIELAB color space, specified by the International Commission on Illumination, in conjunction with ICC profiles defined for the image color space and the colorant color space according to standards specified by the International Color Consortium. The output of the color separation process 104 is data representing a color separated image, with each color separation corresponding to a respective colorant for the colorant color space. This data is provided to a halftone process 106 for generation of halftone comprising a plurality of amplitude modified halftone separations, which together represent the input image. The halftone process 106 outputs halftone data 112 representing the halftone, which may be used subsequently to control printing of the input image using a colorant deposition process.

The halftone process 112 generates halftone data on the basis of halftone screen data 108, which defines a halftone screen for each colorant in the colorant color space. In this respect, each halftone screen defines the center locations (i.e. cell centers) for a plurality of amplitude modulated dots for a respective colorant in the colorant space. Thus, for example, where the colorant space is a CMYK color space, the halftone screen data 108 may define four halftone screens for each of the C, M, Y and K color separations resulting from the color separation process.

The halftone process 106 utilizes the plurality of halftone screens defined in the halftone screen data 108 to generate the plurality of halftone separations. In particular, the halftone process 106 generates each halftone separation by placing dots at the center locations defined by the halftone screens and modulating the amplitude (i.e. the size) of the placed dots to approximate the tonal range defined in the color separated images output by the color separation process 104.

The plurality of halftone screens defined by the halftone screen data 108 are generated by a halftone screen generation process 110, which is configured to control the relative LPI and orientation of each halftone screen in accordance with the harmonic condition discussed above. In this respect, the halftone screen generation process 110 may be part of the imaging pipeline 100, as shown in FIG. 1, or may be a separate process (e.g. external to the printing system). In this latter case, the halftone screen generation process 110 may be utilized to "pre-generate" the halftone screen data 108 for use in the imaging pipeline 100.

In some examples, the halftone screen generation process 108 is configured to control the relative angle and resolution of the set of halftone screens defined by the halftone screen data 108 to meet the harmonic condition discussed above. In this respect, the harmonic condition may be considered as defining a combination of angular separation and relative resolution (i.e. dot spacing) between a first halftone screen and a second halftone screen to ensure minimal moiré interference in an image generated on the basis of the halftone screen data 108. For example, where the first halftone screen and the second halftone screen are regular halftone screens (i.e. dot centers are located according to a square grid), the halftone generation process 108 may control the orientation and resolution of a first halftone screen and a second halftone screen such that a relative angle between the first halftone and the second halftone screen is approximately 45 degrees or less and the ratio of the first resolution to the second resolution is less than one (i.e. the ratio of the dot spacing of the second halftone screen to the dot spacing of the first halftone screen is less than one). In this respect, the dot spacing is the minimal distance between the dots centers of two adjacent dots in the halftone separation.

In a particular example, the angular separation between the first halftone screen and the second halftone screen is approximately 45 degrees and the ratio of the first resolution to the second resolution is approximately $\frac{1}{2}\sqrt{2}$. According to this configuration, the spacing between dots in the second halftone screen is substantively "harmonic" with respect to the spacing between dots in the first halftone screen in the 45 degree direction (i.e. in the orientation direction of the second halftone screen). In other words, the frequency of dots in the second halftone screen is harmonic with respect to the frequency of dots in the first halftone screen, in the direction of the second halftone screen (i.e. the 45 degree direction). This structural relationship between the first and second halftone screens ensures that an image generated based on the halftone screens, when printed, is substantially free of moiré interference in the form of rosette structures between the first and second halftone separations.

In some practical applications, the "harmonic" condition may be satisfied by selecting a resolution of 160 LPI for the first halftone screen and a resolution of 225 LPI for the second halftone screen, and providing an angular separation of 45 degrees between the first halftone screen and the second halftone screen. These resolutions are particularly suitable for halftones printed using a digital printing process.

In some examples, the first halftone screen is associated with a first colorant and the second halftone screen is associated with a second colorant, different from first colorant. For example, the first colorant may be a non-black colorant (e.g. C, M or Y in a CMYK colorant space) and the second colorant may be a black colorant (e.g. K in the CMYK colorant space). This ensures that moiré interference in respect of the more visible black colorant is minimized, thereby resulting in improved image quality.

In some examples, the halftone screen generation process 110 may generate further halftone screens corresponding to other colorants in the colorant space. For example, when the first halftone screen and the second halftone screen correspond to the M and K separations respectively, the halftone screen generation process 110 may generate further halftone screens for the C and Y separations. In some examples, the C and Y halftone screens may be generated with the same orientation and resolution of the M halftone screen. In this respect, the lower resolution (i.e. larger dot spacing) of the C, M and Y separations provides relatively good tolerance to CPR error, irrespective of the common orientation of the C, M and Y halftone separations.

Figure 2:
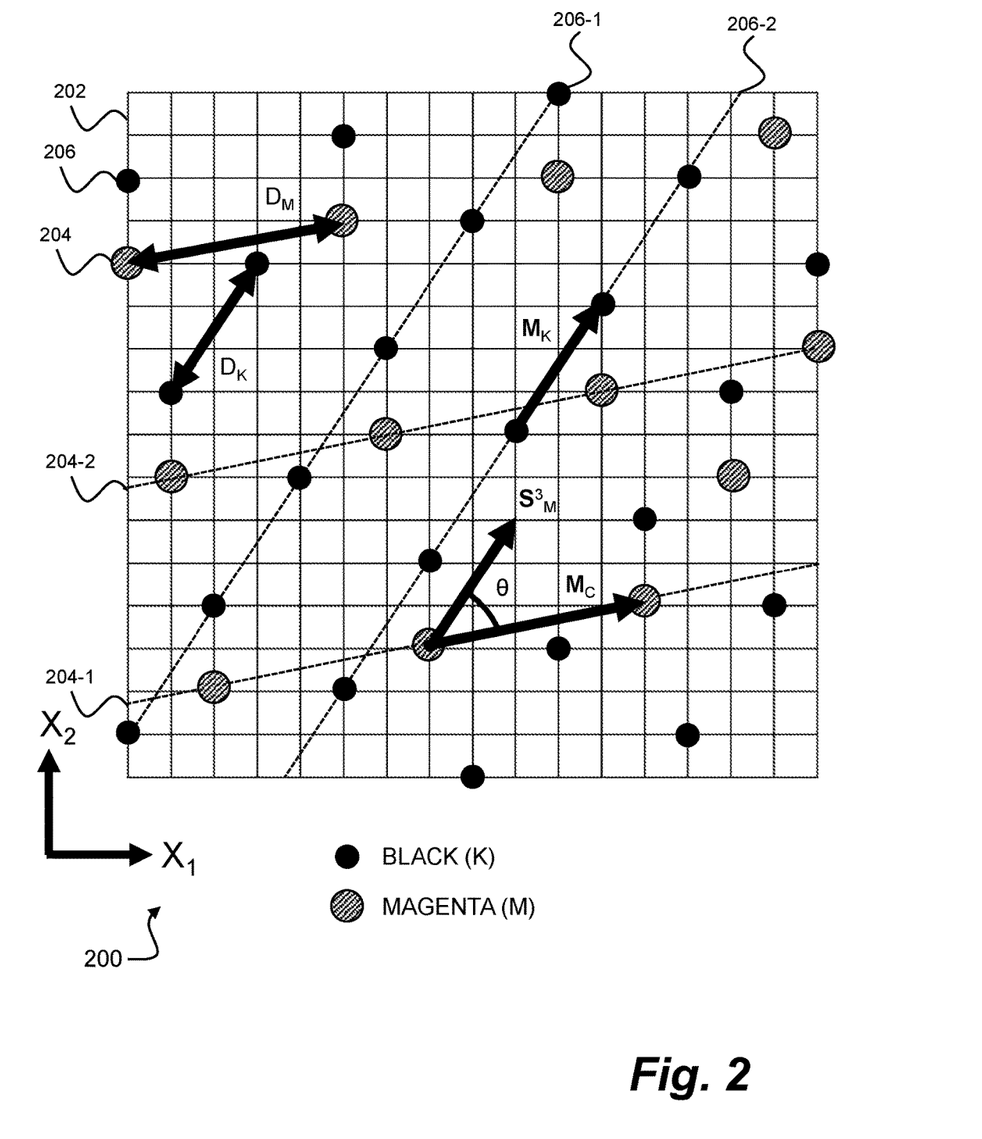
FIG. 2 is a schematic diagram showing a first halftone in accordance with an example.
Figure 3:
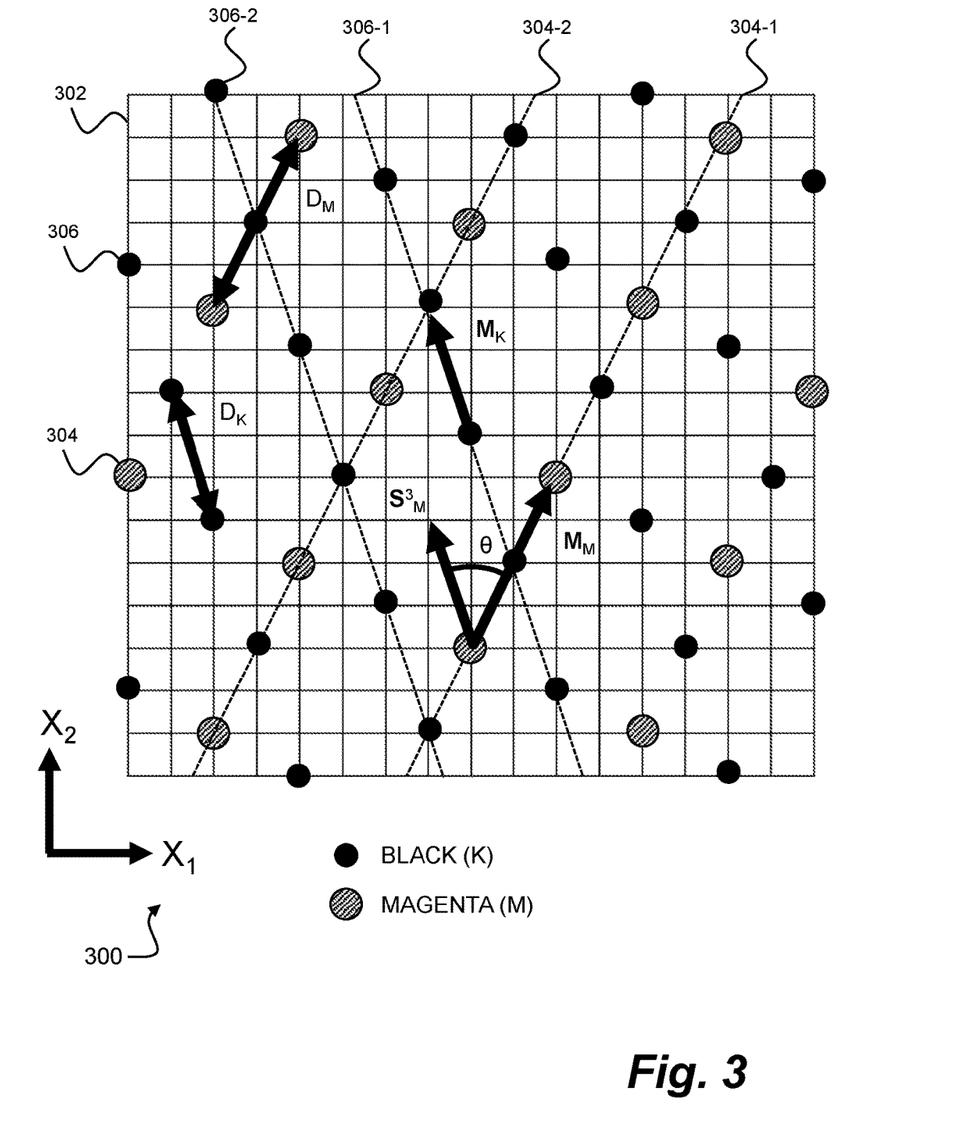
FIG. 3 is a schematic diagram showing a second halftone in accordance with an example.
Figure 4:
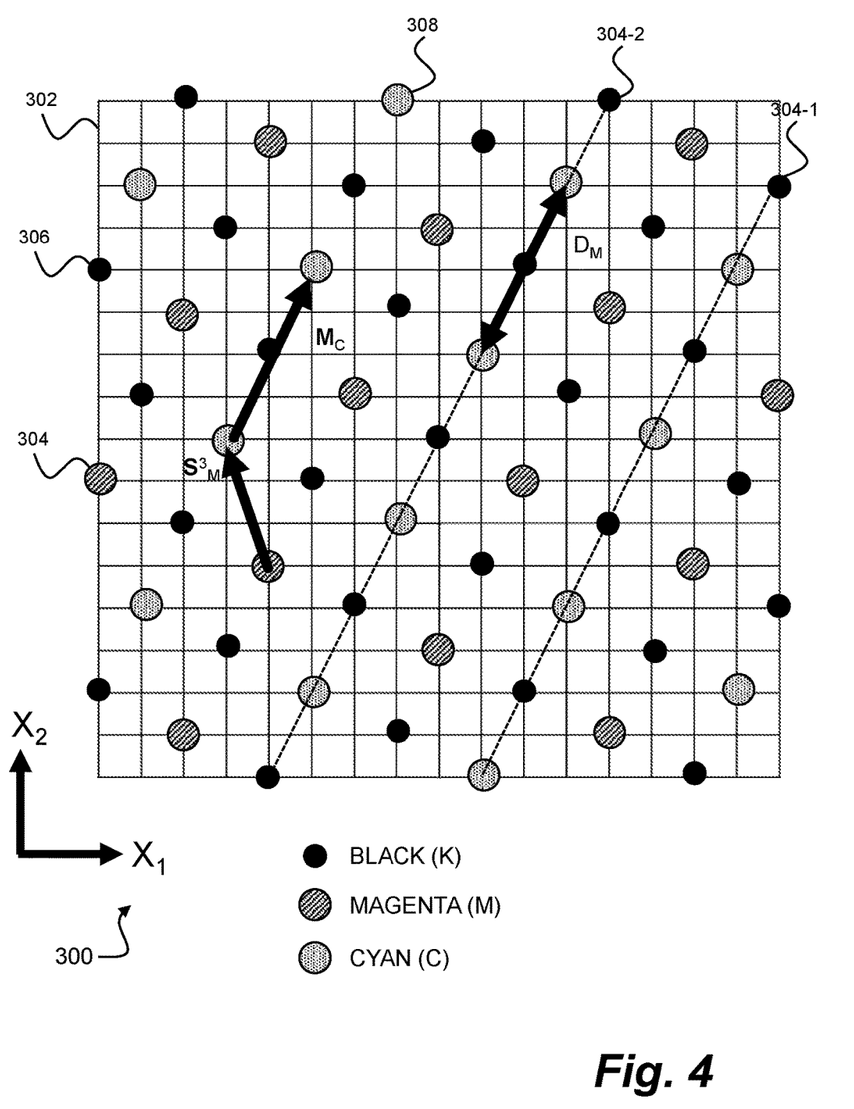
FIG. 4 is a schematic diagram showing a third halftone in accordance with an example.

FIGS. 2, 3 and 4 illustrate examples of halftones generated by the halftone screen generation process 110 in accordance with the "harmonic" condition. In this respect, each illustrated halftone is comprised of a plurality of "regular" halftone screens (i.e. halftone screens where cell centers correspond to a pixel grid) and may be described in terms of a spacing vector $M=[m_1, m_2]$, wherein $m_1$ and $m_2$ are integer values that represent the distances between two cell centers in terms of an addressable pixel grid in the $X_1$ and $X_2$ directions respectively. Following this definition, a shift or offset with respect to a first halftone screen may be expressed in terms of a shift vector $S=[s_1, s_2]$, wherein $s_1$ and $s_2$ are integer values that represent the offset distance from a given cell center in the first halftone screen in terms of the addressable pixel grid in the $X_1$ and $X_2$ directions respectively. Based on this definition, the most "symmetric" shifts associated with the first halftone screen may be expressed as:

$$S^1=[s_1, s_2]=[m_1/2, m_2/2];$$

$$S^2=[s_1, s_2]=[m_2/2, -m_1/2];\text{ and}$$

$$S^3=[s_1, s_2]=[(m_1-m_2)/2, (m_1+m_2)/2].$$

Thus, according to the first shift, $S^1$, and the second shift, $S^2$, each cell center is shifted to a position between two cell centers in of the first halftone screen at angles of 0 degrees and 90 degrees to the orientation of the first halftone screen. In contrast, according to the third shift, $S^3$, each cell center is shifted to a position diagonally between two cell centers in the first halftone screen at an angle of 45 degrees to the orientation of the first halftone screen, thereby maximizing the separation between cells in the first halftone and cells in the shifted halftone. In this respect, the sensitivity of the first shift, $S^1$, and the second shift, $S^2$, is approximately 2×LPI of the halftone screen, whereas the sensitivity of the third shift, $S^3$, is given by $\sqrt{2}$×LPI for the first halftone screen. In other words, the third shift is more tolerant to CPR error than the first shift, $S^2$, and second shift, $S^3$.

The halftones illustrated in FIGS. 2, 3 and 4 utilize the additional CPR tolerance provided by the third shift, $S^3$, as the basis to define relative angular orientation and resolution of the first halftone and screen and the second halftone screen in a manner which satisfies the "harmonic" condition discussed above.

FIG. 2 shows portion of a first halftone 200 generated by the halftone process 106 in accordance with an example. The halftone 200 is illustrated with reference to a pixel grid or array 202, with each point in the pixel grid 202 corresponding to the center of a print-level pixel in the halftone 200. It will be appreciated that the pixel grid 202 is shown for illustration purposes and does not form part of the halftone 200 itself. The halftone 200 comprises a first halftone separation comprising a first plurality of amplitude modulated dots 204 (shown as cross-hatched dots) and a second halftone separation comprising a second plurality of amplitude modulated dots 206 (shown as solid black dots). In this example, the first plurality of amplitude modulated dots 204 correspond to the magenta separation in the CMYK colorant color space (i.e. are formed by deposition of the magenta colorant onto a print medium), and the second plurality of amplitude modulated dots correspond to the black separation in the CMYK colorant color space (i.e. are formed by deposition of the black colorant onto the print medium. In this respect, the first plurality of amplitude dots 204 and the second plurality of amplitude modulated dots 206 are shown as comprising dots of a same "nominal" size for ease of understanding, but it will be appreciated that the dot size may be varied to provide a range of tones in the halftone.

The first plurality of amplitude modulated dots 204 are associated with a vector $M_M=[5, 1]$, which specifies that the adjacent dots in the first plurality of amplitude modulated dots are separated by 5 pixels in the $X_1$ direction and 1 pixel in the $X_2$ direction. This corresponds to a dot spacing $D_M$ in a direction illustrated by rows 204-1 and 204-2 in FIG. 2. As discussed above, the most symmetric shift associated with the first halftone separation is the third shift, $S_M^3$, which is determined as $S_M^3=[s_1, s_2]=[(m_1-m_2)/2, (m_1+m_2)/2]=[(5-1)/2, (5+1)/2]=[2, 3]$. As shown in FIG. 2, this shift corresponds to a shift angle, θ, of 45 degrees, relative to the orientation of the first halftone separation, as indicated by rows 204-1 and 204-2.

The second plurality of amplitude modulated dots 206 in the second halftone separation are defined according to $M_K=S_M^3=[2, 3]$, which specifies that the adjacent dots in the first plurality of amplitude modulated dots are separated by 2 pixels in the $X_1$ direction and 3 pixel in the $X_2$ direction, as shown. This corresponds to a dot spacing $D_K$ in a direction illustrated by rows 206-1 and 206-2 in FIG. 2. In other words, the second halftone separation is arranged in a direction that is parallel to the direction defined by the third shift, $S_M^3$, for the first halftone separation. Moreover, the dot spacing associate with the second plurality of amplitude modulated dots, $D_K$, satisfies $(2D_K)^2=2D_M^2$ or $D_{K/DM}=\frac{1}{2}\sqrt{2}$. Thus, the dot frequency of the first halftone separation is effectively a harmonic of the dot frequency of the second halftone separation in the direction defined by $M_K=S_M^3=[2, 3]$.

As discussed above, the ratio between the second dot spacing, $D_K$, and the first dot spacing, $D_K$, in FIG. 2 may be achieved by printing the first halftone screen at a resolution of 160 LPI and the second halftone screen at a resolution of 225 LPI. In other words, the "harmonic" condition may be realized by overlaying a first halftone screen with a resolution of 160 LPI and a second halftone screen with resolution of 225 LPI, with an angular separation of 45 degrees.

FIG. 3 shows portion of a second halftone 300 generated by the halftone process 106 in accordance with an example. As with the first halftone 200 of FIG. 2, the second halftone 300 of FIG. 3 is illustrated with reference to a pixel grid or array 302, with each point in the grid corresponding to the center of a pixel in the halftone 300. It will be appreciated that the pixel grid 302 is shown for illustration purposes and does not form part of the halftone 300. The second halftone 300 comprises a first halftone separation comprising a first plurality of amplitude modulated dots 304 (shown as cross-hatched dots) and a second halftone separation comprising a second plurality of amplitude modulated dots 306 (shown as solid black dots). In this example, the first plurality of amplitude modulated dots 304 correspond to the magenta separation in the CMYK colorant color space (i.e. are formed by deposition of the magenta colorant onto a print medium), and the second plurality of amplitude modulated dots 306 correspond to the black separation in the CMYK colorant color space (i.e. are formed by deposition of the black colorant onto the print medium. In this respect, the first plurality of amplitude dots 304 and the second plurality of amplitude modulated dots 306 are shown as comprising dots of a same "nominal" size for ease of understanding, but it will be appreciated that the dot size may be varied to provide a range of tones in the halftone.

The first plurality of amplitude modulated dots 304 are associated with a vector $M_M=[2, 4]$, which specifies that the adjacent dots in the first plurality of amplitude modulated dots are separated by 2 pixels in the $X_1$ direction and 4 pixels in the $X_2$ direction, as shown. This corresponds to a dot spacing $D_M$ in a direction illustrated by rows 304-1 and 304-2 in FIG. 3. As discussed above, the most symmetric shift associate with the first halftone separation is the third shift, $S_M^3$, which is determined as $S_M^3=[s_1, s_2]=[(m_1-m_2)/2, (m_1+m_2)/2]=[(2-4)/2, (2+4)/2]=[-1, 3]$. As shown in FIG. 3, this shift corresponds to a shift angle, θ, of 45 degrees, relative to orientation of the first halftone separation, as indicated by rows 304-1 and 304-2.

The second plurality of amplitude modulated dots 206 in the second halftone separation are defined according to $M_K=S_M^3=[-1, 3]$, which specifies that the adjacent dots in the first plurality of amplitude modulated dots are separated by −1 pixels in the $X_1$ direction and 3 pixel in the $X_2$ direction, as shown. This corresponds to a dot spacing $D_K$ in a direction illustrated by rows 306-1 and 306-2 in FIG. 3. In other words, the second halftone separation is arranged in a direction that is parallel to the direction defined by the third shift, $S_M^3$, for the first halftone separation. Moreover, the dot spacing associate with the second plurality of amplitude modulated dots, $D_K$, satisfies $(2D_K)^2=2D_M^2$ or $D_{K/DM}=\frac{1}{2}\sqrt{2}$. Thus, the dot frequency of the first halftone separation is effectively a harmonic of the dot frequency of the second halftone separation in the direction defined by $M_K=S_M^3=[-1, 3]$.

As discussed above, the ratio between the second dot spacing, $D_K$, and the first dot spacing, $D_K$, in FIG. 3 may be achieved by printing the first halftone screen at a resolution of 160 LPI and the second halftone screen at a resolution of 225 LPI. In other words, the "harmonic" condition may be realized by overlaying a first halftone screen with a resolution of 160 LPI and a second halftone screen with resolution of 225 LPI, with an angular separation of 45 degrees.

As discussed above, further non-black halftone separations may be placed is the same orientation (i.e. same angle) as the first halftone separation and using the same dot spacing. In this respect, FIG. 4 illustrates the halftone 300 of FIG. 3, further comprising a third halftone separation. In this case, the third halftone separation comprises a third plurality of amplitude modulated dots 308 corresponding to the cyan separation in the CMYK colorant color space (i.e. are formed by deposition of the cyan colorant onto the print medium). In this respect, the third plurality of amplitude modulated dots 308 are associated with a vector $M_C=M_M=[2, 4]$, which specifies that the adjacent dots in the first plurality of amplitude modulated dots are separated by 2 pixels in the $x_1$ direction and 4 pixels in the $x_2$ direction, as shown (i.e. the same as the second halftone separation). This corresponds to a dot spacing $D_M=D_M$ in a direction illustrated by rows 308-1 and 308-2 in FIG. 4.

As discussed above, the most symmetric shift associate with the first halftone separation is the third shift, $S_M^3=[-1, 3]$. Accordingly, the third plurality of dots 308 associated with the third halftone separation are shifted with respect to the first halftone separation by [−1, 3], as shown in FIG. 4. In other words, the relative displacement between the first halftone separation and the third halftone separation is such that plurality of dots in the third halftone separation are positioned the maximum distance from the plurality of dots in the first halftone separation, thereby providing tolerance to CPR errors between the magenta separation and the cyan separation.

The first halftone 200, second halftone 300 and third halftone 300 discussed above with reference to FIGS. 3, 4 and 5 provide minimal or zero moiré interference between the black halftone separation and the one or more non-black halftone separations by virtue of satisfying the "harmonic" condition. Accordingly, images printed using these halftones exhibit a smooth microstructure with an absence of rosette structures. Moreover, the relatively large dot spacing utilized for the non-black halftone separations provides a level of tolerance to CPR errors which renders the halftones as particularly suitable for mass production.

A further feature of the first halftone 200, second halftone 300 and third halftone 300 is an improvement in colorant efficiency due to the relative separation between dots in each color separation. In other words, the relative separation between dots in each color separation results in relatively less overlap between colorants, and thus an improvement in colorant efficiency of approximately 4 percent.

Figure 5:
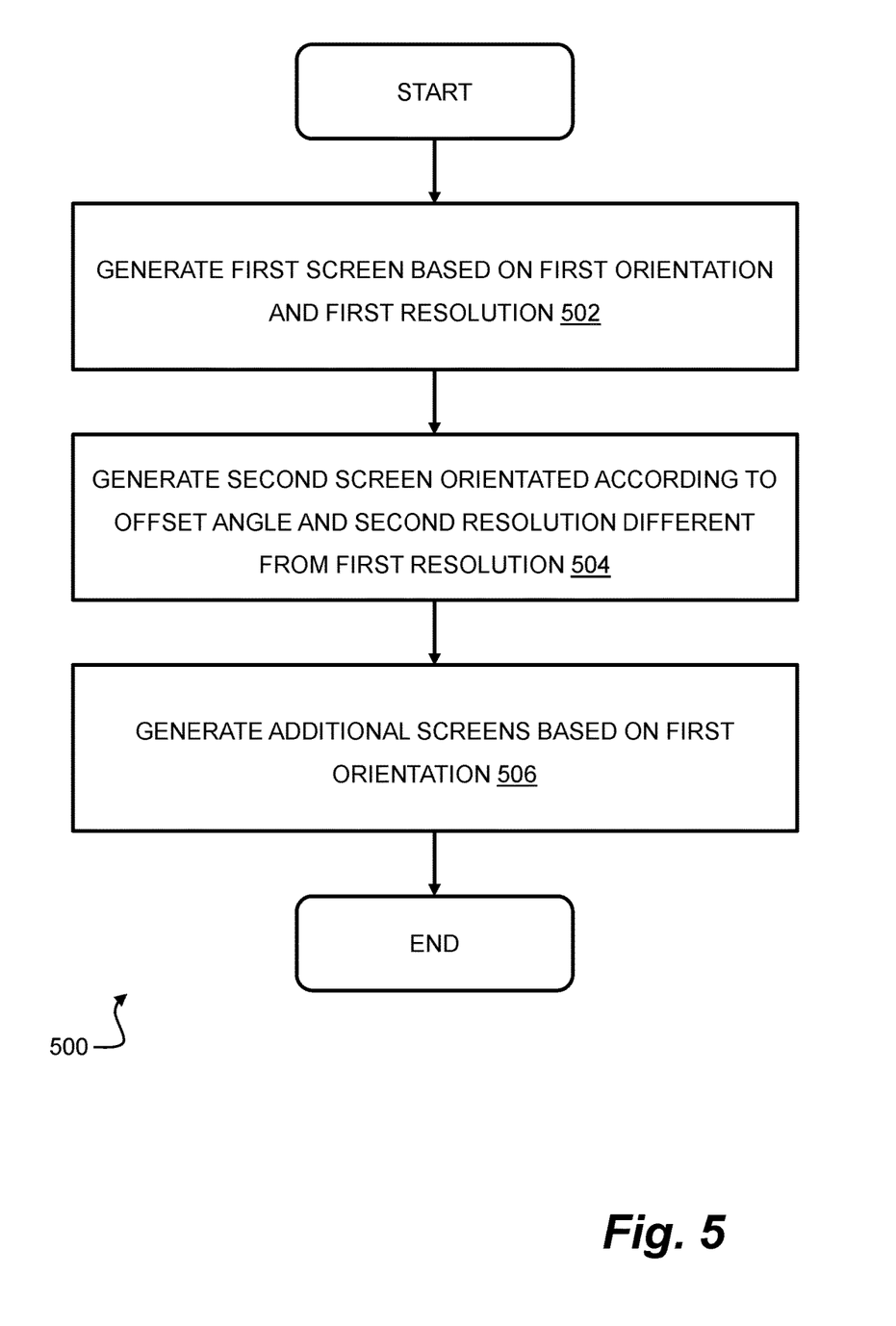
FIG. 5 is a flow diagram showing a method of generating a halftone screen in accordance with an example.

FIG. 5 shows an example of a method performed by the halftone process 106 of FIG. 1 to generate a color separated halftone. In block 502, the halftone separation control process 110 generates data representing a first halftone separation comprising a first plurality of amplitude modulated dots arranged according to a first plurality of parallel rows and a first resolution. In block 504, the halftone process 106 generates data representing a second halftone separation comprising a second plurality of amplitude modulated dots arranged according to a second plurality of parallel rows and a second resolution. The second plurality of parallel rows may be orientated an angle relative to the first plurality of parallel rows of 45 degrees of less. For example, when the first plurality of amplitude modulated dots are arranged according to a square lattice, the angle between the first plurality of parallel rows and the second plurality of parallel rows may be approximately 45 degrees. A ratio of the first resolution and the second resolution may be less than 1, thereby ensuring that the dot spacing of the first plurality of amplitude modulated dots in the first halftone separation is greater than the dot spacing of the second plurality of amplitude modulated dots in the second halftone separation. In some examples, the ratio of the first resolution to the second resolution is given as $\frac{1}{2}\sqrt{2}$. Moreover, the ratio of the first resolution to the second resolution correspond to a first resolution of 160 LPI for the first plurality of amplitude modulated dots and a second resolution of 225 LPI for the second plurality of amplitude modulated dots. In other words, the second plurality of amplitude modulated dots are relatively more densely distributed in the halftone than the first plurality of amplitude modulated dots. In block 506, the halftone process 106 generates data representing one or more further halftone separations, with each further halftone separation comprising a further plurality of amplitude modulated dots arranged according to a further plurality of parallel rows, wherein the further plurality of rows are parallel to the first plurality of parallel rows.

In the case of a CMYK color model, the second halftone separation may correspond to the black colorant, and the other halftone separations may correspond to the non-black colorants: cyan, magenta and yellow. Thus, the non-black colorants are orientated in the same direction and the black colorant is orientated according to an angular separation and dot spacing that satisfies the harmonic condition discussed above. Where the second halftone separation corresponds to a black colorant, the relatively higher resolution of the second halftone separation ensures that the resulting image exhibits minimal or zero moiré interference and the absence of rosette structures. Moreover, the relatively lower resolution of the first and further halftone separations relative to the second halftone separation ensures that the non-black colorants provides improved tolerance to registration errors between the halftone separations, and ensures that that the resulting halftone is suitable for printing using mass production techniques. Consequently, the image resulting from the method 500 of FIG. 5 exhibits improved image quality in terms of perceived sharpness and smoothness. Moreover, the resulting halftone provides improved distribution of amplitude modulated dots, and therefore may result in improved colorant efficiency due to relatively less colorant overlap.

Figure 6:
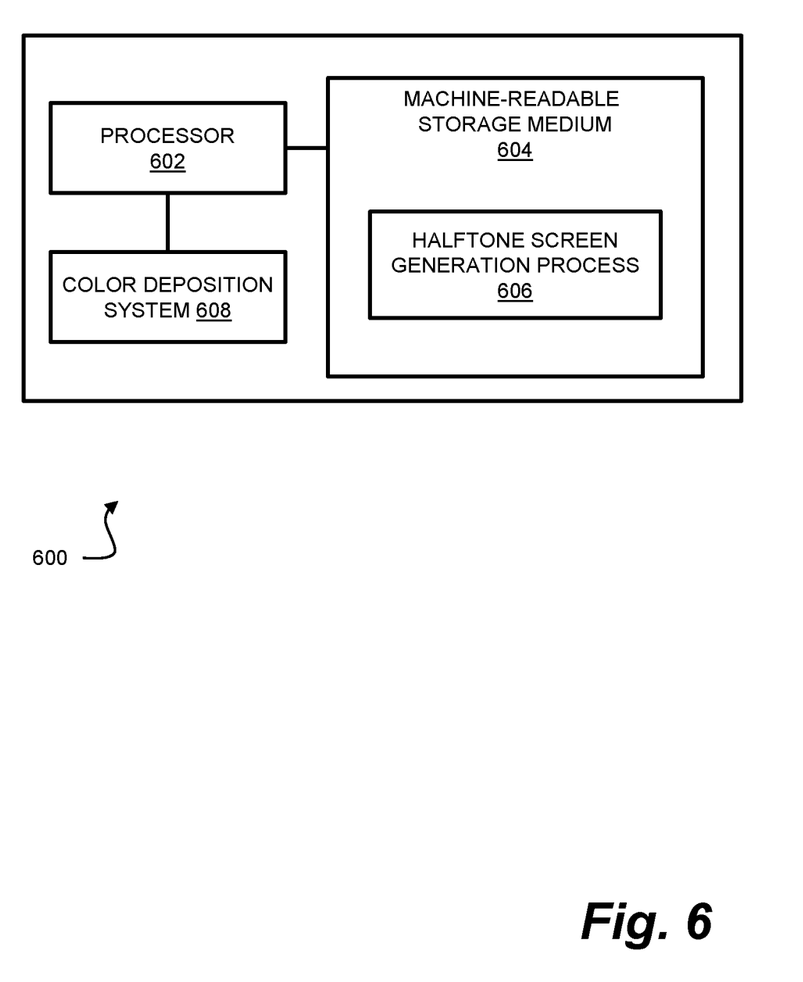
FIG. 6 is a schematic diagram showing a printer system in accordance with an example.

Certain methods and system described herein may be implemented by a processor that processes computer program code that is retrieved from a non-transitory storage medium. FIG. 6 shows an example of an apparatus 600, such as a printer system, which comprises a machine-readable storage medium 604 coupled to a processor 602. The machine-readable storage medium 604 can be any non-transitory media that can contain, store, or maintain programs and data for use by or in connection with an instruction execution system. The machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 6, the machine-readable storage medium 604 comprises executable instructions or program code 606 to generate halftone data in the manner described above with reference to FIGS. 1 to 5, such as the halftone separation control process 110 of FIG. 1. In some examples, the apparatus 600 may comprise a colorant deposition system 608 which, under the control of the processor 602 and the program code 606, deposits a plurality of colorants onto a print medium to generate one or more of the halftones resulting from the techniques described above with reference to FIGS. 1 to 5.

The executable instructions or program code 606, when executed by the processor 602, cause the processor 602 to generate a halftone in the manner described above with reference to FIGS. 1 to 5. For example, the program code 606 may cause the processor to control the colorant deposition system 608 to deposit a first colorant in a plurality of colorants onto the medium to form first plurality of amplitude modulated dots and to deposit a second colorant in the plurality of colorants onto the medium to form a second plurality of amplitude modulated dots. In this respect, the first plurality of amplitude modulated dots may be arranged according to a first plurality of parallel rows and the second plurality of amplitude dots may be arranged according to a second plurality of rows which are orientated at an angle of 45 degrees relative to the first plurality of rows. Further, the first plurality of amplitude modulated dots may be associated with a first dot spacing and the second plurality of amplitude dots may be associated with a second dot spacing, wherein a ratio of the second dot spacing to the first dot spacing is approximately $\frac{1}{2}\sqrt{2}$. In some examples, this ratio of the second dot spacing to the first dot spacing may correspond to a resolution of 160 LPI for the first plurality of amplitude modulated dots, and a resolution of 225 LPI for the second plurality of amplitude modulated dots. In other words, the second plurality of amplitude modulated dots are relatively more densely distributed in the halftone than the first plurality of amplitude modulated dots.

The preceding description has been presented to illustrate and describe examples of the principles described. This description is not intended to be exhaustive or to limit these principles to any precise form disclosed. Many modifications and variations are possible in light of the above teaching.

What is claimed is:

1. An apparatus comprising:
   a colorant deposition system to deposit a plurality of colorants on a medium;
   a processor; and
   a memory storing computer-executable instructions which, when executed by the processor, cause the processor to:
   control the colorant deposition system to deposit a first colorant in the plurality of colorants onto the medium to form first plurality of amplitude modulated dots and to deposit a second colorant in the plurality of colorants onto the medium to form a second plurality of amplitude modulated dots;
   wherein:
   the second plurality of amplitude modulated dots are arranged according to an offset shift with respect to the first plurality of amplitude modulated dots, the offset shift defined by a shift vector $S=[s_1, s_2]$, wherein $s_1$ and $s_2$ are integer values that represent an offset distance for a dot in the second plurality of amplitude modulated dots from a given cell center in the first plurality of amplitude modulated dots, where $S=[s_1, s_2]=[(m_1-m_2)/2, (m_1+m_2)/2]$ and where $m_1$ and $m_2$ are integer values that represent a distance between respective cell centers in an addressable pixel grid.

2. The apparatus of claim 1, wherein the first plurality of amplitude modulated dots are of a different color than the second plurality of amplitude modulated dots.

3. The apparatus of claim 1, wherein the first plurality of amplitude modulated dots has a dot spacing that defines a resolution of 160 lines per inch and the second plurality of amplitude modulated dots has a dot spacing that defines a resolution of 225 lines per inch.

4. The apparatus of claim 1, wherein the first plurality of amplitude modulated dots has a first dot spacing and the second plurality of amplitude modulated dots has a second dot spacing and wherein a ratio of the second dot spacing to the first dot spacing is $\frac{1}{2}\sqrt{2}$.

5. The apparatus of claim 1, wherein the shift vector has an angle of 45 degrees with respect to the addressable pixel grid.

6. The apparatus of claim 1, wherein the first plurality of amplitude modulated dots has a first resolution and the second plurality of amplitude modulated dots has a second resolution and wherein a ratio of the first resolution to the second resolution is less than one.

7. An apparatus comprising:
   a colorant deposition system to deposit a plurality of colorants on a medium;
   a processor; and
   a memory storing computer-executable instructions which, when executed by the processor, cause the processor to:
   control the colorant deposition system to deposit a first colorant in the plurality of colorants onto the medium to form first plurality of amplitude modulated dots and to deposit a second colorant in the plurality of colorants onto the medium to form a second plurality of amplitude modulated dots;
   wherein the first and second plurality of amplitude modulated dots are arranged to meet a harmonic condition defined by a relative angular separation and relative resolution that minimizes moiré interference in an image composed of both pluralities of amplitude modulated dots.

8. The apparatus of claim 7, wherein the second plurality of amplitude modulated dots are arranged according to an offset shift with respect to the first plurality of amplitude modulated dots, the offset shift defined by a shift vector $S=[s_1, s_2]$, wherein $s_1$ and $s_2$ are integer values that represent an offset distance for a dot in the second plurality of amplitude modulated dots from a given cell center in the first plurality of amplitude modulated dots, where $S=[s_1, s_2]=[(m_1-m_2)/2, (m_1+m_2)/2]$ and where $m_1$ and $m_2$ are integer values that represent a distance between respective cell centers in an addressable pixel grid.

9. The apparatus of claim 8, wherein the shift vector has an angle of 45 degrees with respect to the addressable pixel grid.

10. The apparatus of claim 7, wherein the first plurality of amplitude modulated dots are of a different color than the second plurality of amplitude modulated dots.

11. The apparatus of claim 7, wherein the first plurality of amplitude modulated dots has a dot spacing that defines a resolution of 160 lines per inch and the second plurality of amplitude modulated dots has a dot spacing that defines a resolution of 225 lines per inch.

12. The apparatus of claim 7, wherein the first plurality of amplitude modulated dots has a first dot spacing and the second plurality of amplitude modulated dots has a second dot spacing and wherein a ratio of the second dot spacing to the first dot spacing is $\frac{1}{2}\sqrt{2}$.

13. The apparatus of claim 7, wherein the first plurality of amplitude modulated dots has a first resolution and the second plurality of amplitude modulated dots has a second resolution and wherein a ratio of the first resolution to the second resolution is less than one.

14. A method of minimizing moiré interference in an image, the method comprising:

controlling a colorant deposition system to deposit a first colorant in a plurality of colorants onto a medium to form first plurality of amplitude modulated dots and to deposit a second colorant in the plurality of colorants onto the medium to form a second plurality of amplitude modulated dots;

wherein the first and second plurality of amplitude modulated dots are arranged to meet a harmonic condition defined by a relative angular separation and relative resolution that minimizes moiré interference in an image composed of both pluralities of amplitude modulated dots.

15. The method of claim 14, wherein:

the first plurality of amplitude modulated dots are deposited with a dot spacing in which dots are separated by five pixels in an $X_1$ direction and one pixel in an $X_2$ direction orthogonal to $X_1$; and the second plurality of amplitude modulated dots are deposited with a dot spacing in which dots are separated by two pixels in the $X_1$ direction and three pixels in the $X_2$ direction.

16. The method of claim 14, further comprising depositing the first plurality of amplitude modulated dots with a different colorant than the second plurality of amplitude modulated dots.

17. The method of claim 14, further comprising depositing a third plurality of amplitude modulated dots, where an orientation of the third plurality of amplitude modulated dots is based on orientation of the first plurality of amplitude modulated dots.

18. The method of claim 14, wherein the second plurality of amplitude modulated dots are arranged according to an offset shift with respect to the first plurality of amplitude modulated dots, the offset shift defined by a shift vector $S=[s_1, s_2]$, wherein $s_1$ and $s_2$ are integer values that represent an offset distance for a dot in the second plurality of amplitude modulated dots from a given cell center in the first plurality of amplitude modulated dots, where $S=[s_1, s_2]=[(m_1-m_2)/2, (m_1+m_2)/2]$ and where $m_1$ and $m_2$ are integer values that represent a distance between respective cell centers in an addressable pixel grid.

19. The method of claim 18, wherein the shift vector has an angle of 45 degrees with respect to the addressable pixel grid.

20. The method of claim 18, wherein the first plurality of amplitude modulated dots has a first dot spacing and the second plurality of amplitude modulated dots has a second dot spacing and wherein a ratio of the second dot spacing to the first dot spacing is $\frac{1}{2}\sqrt{2}$.

* * * * *